106. COMPOSITIONS, COATING OR PLASTIC.

91

346,733

UNITED STATES PATENT OFFICE.

HENRY A. DANIELS, OF YONKERS, NEW YORK.

ARTIFICIAL STONE.

SPECIFICATION forming part of Letters Patent No. 346,733, dated August 3, 1886.

Application filed January 15, 1886. Serial No. 188,677. (No specimens.)

*To all whom it may concern:*

Be it known that I, HENRY A. DANIELS, a citizen of the United States, and a resident of Yonkers, in the county of Westchester and State of New York, have invented certain new and useful Improvements in Artificial Stone, of which the following is a specification.

In an application for Letters Patent Serial No. 188,673, I have described an artificial stone consisting of sand, cement, and a binding material, as caoutchouc or glue, and in other applications I have described other artificial-stone compositions, in which the sand, cement, and binding material are combined with other ingredients; and my present invention consists, in the addition to the said materials, of a proportion of vitriol, either white vitriol or blue vitriol, which has the effect of rendering the composition more permanent, preventing it from being so rapidly dissolved or worn by exposure to the elements, and aiding in imparting a crystalline character to the stone.

In the manufacture of my improved artificial stone, I use the materials in about the following proportions: sand, ten pounds; cement, five pounds; caoutchouc, gum, or glue, one-fourth of a pound, and vitriol, one-eighth of a pound. The sand and cement are mixed dry, and if a coloring material is used it is mixed with the sand and cement. The other materials are dissolved in a suitable solvent, a gallon of which is used for the proportions named. For instance, the glue and vitriol are dissolved in one gallon of water, and sufficient of the solution is mixed with the powdered ingredients to form a paste of the desired consistency, which is then spread, molded, or otherwise applied and hardened in the usual manner. In some instances I add potash, soluble glass, muriate of soda, or alum to the above-named ingredients in such proportions as may be found desirable.

Without limiting myself to the precise proportions of ingredients set forth, I claim—

An artificial stone consisting of sand, cement, a binding agent, as glue, and vitriol, substantially as set forth.

In testimony whereof I have signed my name to this specification in the presence of two subscribing witnesses.

HENRY A. DANIELS.

Witnesses:
H. M. DICKINSON,
H. P. STAMFORD.